United States Patent [19]

Salisbury

[11] 4,416,845

[45] Nov. 22, 1983

[54] CONTROL FOR ORBITING CHARGED PARTICLES

[75] Inventor: Winfield W. Salisbury, Scottsdale, Ariz.

[73] Assignee: Energy Profiles, Inc., Newtown Square, Pa.

[21] Appl. No.: 63,105

[22] Filed: Aug. 2, 1979

[51] Int. Cl.³ .............................................. G21B 1/00
[52] U.S. Cl. .................................. 376/107; 376/143
[58] Field of Search .......................... 176/2, 5, 1, 3–6, 176/9; 376/105–107, 143

[56] References Cited

U.S. PATENT DOCUMENTS

| | | | |
|---|---|---|---|
| 2,961,558 | 11/1960 | Luce et al. | 176/2 |
| 2,979,635 | 4/1961 | Burleigh | 176/2 |
| 3,005,767 | 10/1961 | Boyer et al. | 176/3 |
| 3,052,614 | 9/1962 | Herold | 176/2 |
| 3,096,269 | 7/1963 | Hallback | 176/6 |
| 3,132,996 | 5/1964 | Baker et al. | 176/6 |
| 3,155,592 | 11/1964 | Hawsew et al. | 176/2 |
| 3,155,593 | 11/1964 | Warnecke et al. | 176/2 |
| 3,343,020 | 9/1967 | Gordon | 176/2 |
| 3,445,333 | 5/1969 | Lecomte | 176/1 |
| 3,533,910 | 10/1970 | Hirsch | 176/1 |
| 3,571,734 | 3/1971 | Consoli et al. | 176/2 |
| 3,749,639 | 7/1973 | Kapitza | 176/2 |
| 3,859,164 | 1/1975 | Nowak | 176/5 |
| 3,935,503 | 1/1976 | Ress | 176/2 |
| 4,189,346 | 2/1980 | Jarnagin | 176/5 |
| 4,244,782 | 1/1981 | Dow | 176/9 |

FOREIGN PATENT DOCUMENTS

| | | | |
|---|---|---|---|
| 1414949 | 11/1971 | Fed. Rep. of Germany | 176/2 |
| 884705 | 12/1961 | United Kingdom | 176/2 |
| 1012751 | 12/1965 | United Kingdom | 176/2 |

OTHER PUBLICATIONS

Supporting Paper No. 3, Controlled Nuclear Fusion: Current Research and Potential Progress, National Academy of Sciences (1978), pp. 5, 6, 9–11, 33–36.

Primary Examiner—Sal Cangialosi
Attorney, Agent, or Firm—Richards, Harris & Medlock

[57] ABSTRACT

This invention relates to the control of ions orbiting in a cylindrical reaction space and more particularly to attenuation of instabilities in two counterflow streams of ions to focus the ions of both streams into a predetermined orbital reaction zone.

15 Claims, 6 Drawing Figures

CONTROL FOR ORBITING CHARGED PARTICLES

BACKGROUND ART

It is known that individual nuclear particles are so constituted as to permit fusion of some of the lighter nuclei. Fusion of lighter nuclei accompanied by release of energy makes of particular interest any fusion reaction in which energy can be produced in quantities greater than the energy consumed in establishing and maintaining the reaction. There are over 30 reactions known to be possible. The most appealing reactions are those which involve the heavy hydrogen isotopes, deuterium and tritium, because they tend to have the largest fusion reaction cross section at the lowest energies. Many possible reactions are well known. For example, *Van Nostrand's Scientific Encyclopedia,* Fifth Edition, Reinhold Company, New York, N.Y., 1976, at page 1656, et seq., discusses various aspects of the possibilities for producing a net energy gain from fusion reactions and briefly describes some of the attempts to perform such reactions with a net gain.

Plasma research has received concentrated attention in many quarters, but the formidable task of plasma containment has yet to be solved. In avoidance of the problems of containment, a more recent approach involves laser-induced fusion. In its simplest form focused energetic laser beams are brought to bear on a small deuterium-tritium pellet for heating to fusion temperatures. Efforts on this and on other fronts such as those involving containment have continued in response to high incentives.

Thus, while many of the possibilities have long been known and have been widely attacked through various approaches towards achieving net gain from fusion, the challenge remains unsatisfied.

The obvious advantage of fusion power is that it offers the promise of being able to utilize an essentially inexhaustible low cost fuel supply. This prospect grows in stature as world demands for energy continue to increase and conventional fuel sources become depleted or unavailable. A further significant advantage is that optimum fuels may be chosen to produce reaction products which are non-toxic and thus permit energy producing operations compatible with demanding environmental requirements.

In divisional application Ser. Nos. 201,544 and 201,542 both filed on Oct. 28, 1980 and arising from Ser. No. 021,115 filed Mar. 16, 1979 (now abandoned) a system is described for the fusion of light nuclei by controlling the paths of travel of nuclei as to promote head-on collisions. Ions from one source are caused to orbit in one direction by means including a radial electric field in a cylindrical reaction space. Ions from another source orbit in the reaction space in the opposite direction. A cylindrical reaction zone is thus established in which fusion producing collisions are promoted between ions in two counterflow streams.

DISCLOSURE OF THE INVENTION

The present invention is directed toward control of plasma waves. Ions, traveling counter flow in two helical beams in an annular reaction zone due to instabilities or scattering, may depart from their helical orbit and unless forced back into orbit, they would degrade operation of the system.

It has been postulated that head-on collision of ions for fusion may be difficult to achieve at the required reaction density because of instabilities. For example, coulomb scattering may take place because ions involved have net charges of like sign and thus tend to repel each other. Further, two ion streams in the same path may exhibit instability.

It is well known that there is a large cross section for scattering which results in the particles being deflected from incident paths at large angles, approaching 90°. The cross section for scattering may be less than the cross section for fusion. If so, when particles approach each other sufficiently close that they might otherwise undergo high angle scattering, fusion may take place instead.

Scattering at smaller angles than 90° and scattering at angles greater than 5° to 10° are of concern. Where particles are deflected at angles around 5° to 10° a radial electric field may force them back into the orbit from which they were initially deflected.

Particles in a circular orbit that are scattered at angles of the order of 45°, for example, would follow oval paths. The minor axis of the path would be smaller than the orbit axis of the unscattered ions and would have a major axis longer than the axis of the unscattered ions.

Scattering and two stream instability, as plasma properties, are expressions of the statistical cooperative action of all particles in the streams. Individual particle scattering is basically random and leads to the statistical results in evidence of a characteristic frequency of plasma waves. Plasma waves may grow unless suitably controlled. The damping of the cooperative motion among particles is equivalent to extracting their randomness due to scattering.

Two streams of charged particles traveling in the same space at different velocities is a source of contributions to plasma waves and represents an instability known as the two stream instability.

The present invention involves damping plasma waves to focus ions in the desired reaction zone.

More particularly, in accordance with the present invention means are provided for forcing such ions leaving a desired orbit back into a normal reaction zone orbit.

In one aspect, a characteristic resistance is provided to terminate the reaction space to establish structure so that plasma waves which might otherwise grow are prevented from being amplified and the ions are thus maintained in the reaction zone.

In a further aspect, ions leaving the desired orbit are actively sensed and forced back into the reaction zone by active electric fields.

Circuits having components in the walls of the chamber defining the reaction zone may provide forces that will damp plasma waves.

In one aspect of the invention, means preferably are provided at the perimeter of said space to resonate at the frequency of the plasma waves in orbiting ions to establish focusing forces in the reaction zone and attenuate the plasma waves.

With the foregoing points in mind, embodiments of the invention and unique systems employed for control of particles for promoting fusion reactions will now be described.

BRIEF DESCRIPTION OF THE DRAWINGS

A more complete understanding of the invention and its advantages will be apparent from the following detailed description taken in conjunction with the accompanying drawings in which.

DETAILED DESCRIPTION

FIG. 1

Figure 1:
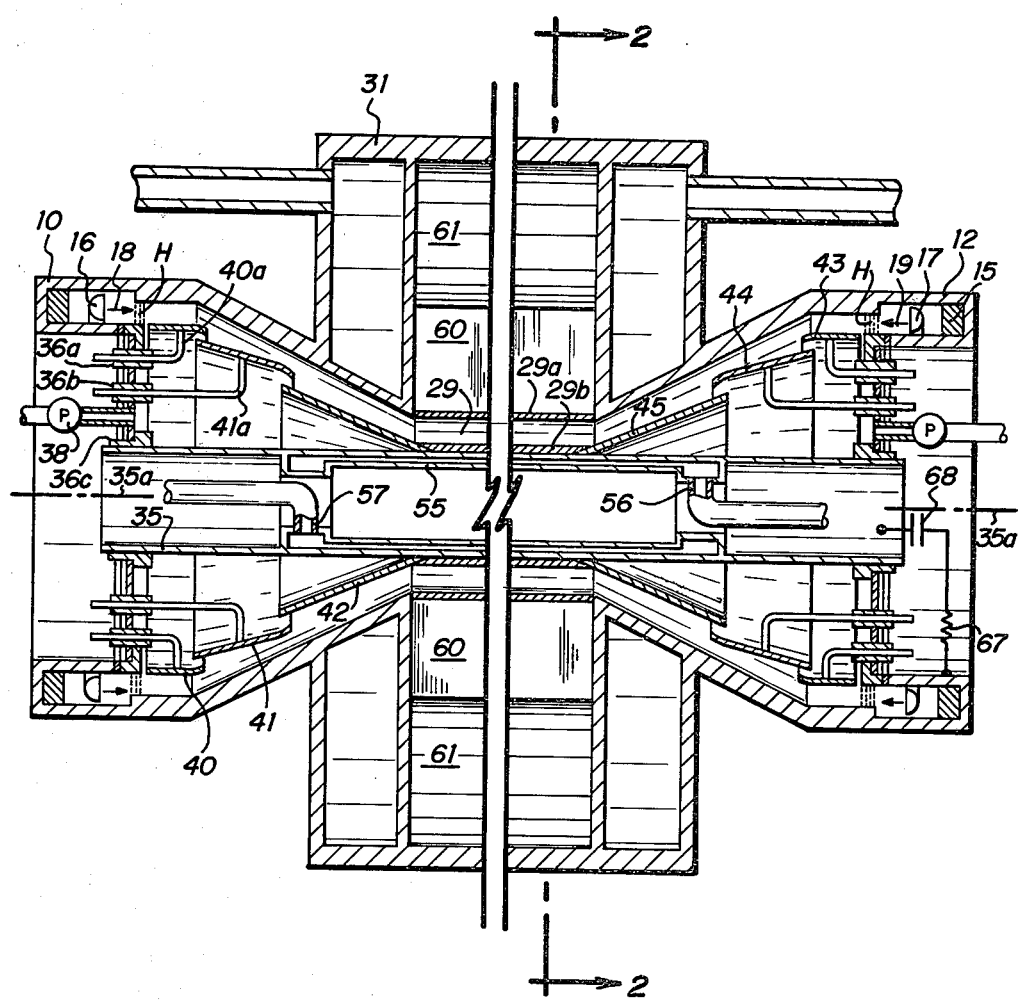
FIG. 1 is a sectional view of a reactor for carrying out the invention.

In FIG. 1, two ion sources 16 and 17 face each other. Ion beams from sources 16 and 17 are accelerated parallel to axis 35a through radial magnetic fields H. The magnetic fields H force the ions into spiral paths. Ions from source 16 travel in one direction along a spiral path and ions from source 17 travel countercurrent through the same space. The spiraling beams, subject to electrostatic fields, follow a path of progressively decreasing radii. More particularly, housing 31 is at a reference potential. Conical electrode 41 is at a different negative potential. Conical electrode 42 is at a still different negative potential. Similarly, the negative potentials on electrodes 43–45 and on cylinder 35 are established from sources, not shown. After beam compression into the thin central cylindrical zone, the ions in the beam from source 16 travel in collision courses with respect to the countercurrent ions in the beam from source 17.

The ions from source 16 may be deuterium ions and ions from the source 17 may be helium three ions. The following well known reaction takes place:

$$D_2 + He_3 \rightarrow He_4 + p + 18.3 \text{ MeV} \qquad (1)$$

Two particles result, i.e., a helium atom and a proton, plus 18.3 MeV of energy. The particles at such energy no longer are confined by the field and, thus, may escape to impinge the cavity wall. The energy is then absorbed by liners 29a in reaction cavity 29. Heat may then be extracted through use of heat exchangers encasing the walls of reaction cavity 29.

Electric fields applied to electrodes 40–45 are such as to force the ions into very thin highly compressed dense beams which follow helical paths having a of very low pitch. Thus focusing, each ion makes many cycles of rotation as part of thin beams as it traverses reaction cavity 29, with head-on collisions resulting in fusion of the colliding particles.

It is to be understood that the entire system in which the ions are generated, compressed and reacted is evacuated. Further, the fields are so tailored as to cause the two beams to travel in the same space through the reaction cavity 29. In practice the pitch would be very low so that in the reaction cavity 29 there would be many passes of an ion in one beam as it threads through the other at the same radius. Head-on collisions are thus promoted.

The electric fields between the housing 31 and the various electrodes are tailored to provide a gradual decrease in the diameter of the spiral paths as the beams travel from sources 16 and 17. More or fewer discrete compression fields than shown may be imposed on the ion beams. The specific configuration will depend upon particular design desired.

In one form, the structure of FIG. 1 includes a hollow annular magnetic ring 10 of rectangular cross section and a circumferential gap 11 in one face thereof. Similarly, a second hollow annular ring 12 is provided with a gap 13. Rings 10 and 12 are spaced apart on a common axis with the gaps 11 and 13 facing each other. Ring 10 is provided with an electrical winding 14. Ring 12 is provided with an electrical winding 15. Controllable currents in windings 14 and 15 produce magnetic fields across gaps 11 and 13 to force the beam to follow spiral paths for introduction into the electric field confinement space with desired angular momentum as will be described.

Ion generator-accelerator source 16 is provided inside ring 10. Ion generator-accelerator source 17 is provided inside ring 12. Source 16 may comprise a plurality of ion beam sources at angularly spaced positions around the circumference of ring 10. A like number of sources angularly spaced around the interior of ring 12 may be used. In such case, many beams, as represented by arrows 18 and 19, are accelerated through gaps 11 and 13, respectively. Magnetic fields across gaps 11 and 13 will cause the beams to be deflected so that rather than following paths in the direction of arrows 18 and 19 they are forced into spiral paths as they move away from gaps 11 and 13. As above noted, electric fields imposed on each beam force the spiraling ions to follow paths of progressively decreasing diameter. As the diameter decreases the ion density increases. The two oppositely traveling high density beams of ions will then thread through each other along helical paths in the cylindrical reaction zone where head-on collisions may take place.

An inner central cylinder 35 extends coaxially of cavity 29. A closure plate 36 is secured between ring 10 and the end of cylinder 35. Similarly, an end closure plate 37 is secured between ring 12 and the end of cylinder 35. With such closure plates, the space inside the housing 31 and outside the central cylinder 35 can be evacuated as by vacuum pumps 38. Two sets of electrodes symmetrical to the axis 35a of the system are provided, one set being located at each end of cavity 29. A first electrode 40 is generally cylindrical in shape. The end of electrode 40 opposite ring 10 is slightly conical. A second electrode 41 is of conical shape with an internal angle less than the angle of the end of the conical section of the electrode 40. A third electrode 42 in the form of a truncated cone is secured to cylinder 35 at the entrance to the cylindrical reaction zone 32 and extends towards ring 10 with the end thereof inside the small end of electrode 41. Electrode 41 extends toward ring 10 with the end thereof inside the end of electrode 40. In a similar manner, electrodes 43, 44, and 45 are mounted in the compression zone.

A heat exchange jacket 55 inside the cylinder 35 spans cavity 29 and is provided with an inlet channel 56 and an outlet channel 57. Jacket 55 is flow connected to a utilization unit 58.

The foregoing description of the structure of the reactor provides a setting for a control system for maintaining ions in the desired reaction orbit.

As above indicated, instabilities may occur in the ion streams which may be akin to plasma waves. Means now to be described are provided to damp, attenuate or counter any such instabilities.

FIG. 2

Figure 2:
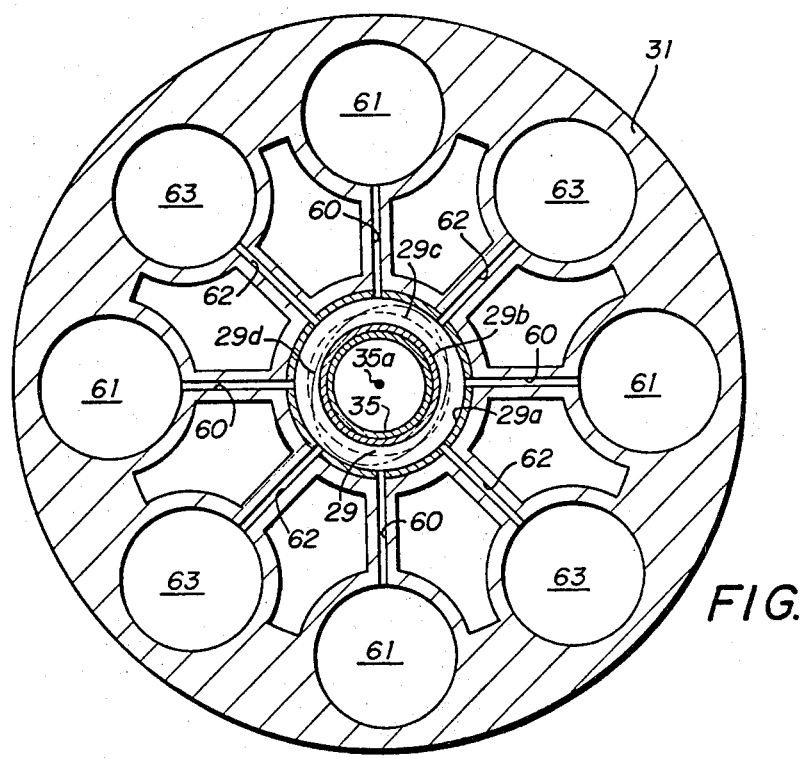
FIG. 2 is a sectional view of FIG. 1 taken along lines 2—2 of FIG. 1.

FIG. 2 is a sectional view taken along the lines 2—2 of FIG. 1. The central cylinder 35 is shown with its carbon liner 29b forming the inner boundary of reaction cavity 29. The liner 29a forms the outer boundary of the reaction cavity 29.

In accordance with the present invention the outer wall of the cavity 29 is the inner wall of a thick shaped metallic housing 31. Housing 31 contains two separate functional structures:

(a) a set of resonant circuits tuned to the plasma frequency in reaction cavity 29, and (b) a plurality of passages through the housing 31 for passage of coolant liquid to carry away heat generated by the high energy particles resulting from fusion impinging the thin pyrolytic liner 29a.

The wall of cavity 29 has a plurality of longitudinal slots which extend radially outward from the inner wall of housing 31. The slots 60 also extend parallel to the axis 35a. Each slot 60 is terminated in a cavity 61. Slot 60 taken with the cavity 61 forms a circuit resonant at one plasma frequency. In a similar manner a plurality of slots 62 alternating with slots 60 extend from the inner wall of the housing 31. The slots 62 similarly extend substantially the length of the reaction cavity 29 parallel to the axis 35a. Slots 62 are terminated in cavities 63. The slot 62-cavity 63 combination is resonant at another plasma frequency.

Coolant fluid passages 64 in housing 31 comprise hollowed out portions of the housing 31 with the passages 64 extending parallel to the axis 35a.

Purpose of the resonant circuits comprising respective slots and cavities 60, 61 and 62, 63 is to create electric fields in the reaction space in response to the passage of ions by the mouth of a given slot. An electric field adjacent to the wall of the reaction cavity 29 focuses scattered nuclei and forces them back toward the desired orbit 29c. More particularly, assume that ions are scattered as to follow the oval path 29d. The minor axis of the path 29d is less than the diameter of the reaction orbit 29c. The major axis is considerably longer than the diameter of the reaction orbit 29c. If the slot 62-cavity 63 combination is tuned to the frequency of the plasma wave then an electric field will be produced at the mouth of the slot 62, which will damp the waves and force the ions from oval path 29d back to the desired reaction orbit 29c.

It is preferred to provide dielectric fillers in each of the radially directed slots 60, 62. The use of appropriate fillers will raise the Q of the system and permit use of slots and cavities of smaller dimensions than if used without fillers. Fillers of aluminim oxide or beyllium oxide or zirconium oxide in the slots and the use of magnetic material such as ferrite or other magnetic ceramic materials inside cavities 61, 63 may be employed.

There are several different wave frequencies possible:
(a) That of the deuterium stream;
(b) That of the helium₃ stream;
(c) That of the reflection of the deuterium stream in the helium plasma; and
(d) That of the reflection of the helium stream in the deuterium plasma.

The plasma frequency is known to be in accordance with the following relationship:

$$\omega p = 2\pi fp \qquad (2)$$

$$= \left(\frac{4\pi n e^2}{m}\right)^{\frac{1}{2}}$$

$$= \frac{8976}{60.6} \sqrt{n} \text{ Hertz (for deuterons)}$$

where:
n = the number of ions per cm³
m = mass of the ions
e = electron charge = 1.6×10⁻¹⁹ coulombs where:
n = 10¹⁸ particles per cm³, the frequency of the plasma wave for deuterons is 1.48×10¹¹ Hz, having a wave length of about 2 millimeters.

Similarly, the other three plasma wave frequencies may be determined. In order to further stabilize the system and further eliminate instabilities due to the presence of two streams of charged particles having different velocities the following provision is made. The reaction cavity 29 may be viewed as an impedance. Suppression of two stream instabilities is enhanced in the present invention by the use of a characteristic impedance unit 67 connected between the source 17, FIG. 1, and the inner cylinder 35. Elimination of DC coupling is provided by the capacitor 68. By terminating the cavity 29 in its characteristic impedance, the two stream instabilities are moderated and suppressed.

In FIG. 2 eight resonant cavity systems are shown. Four comprise slot 60-cavity 61 combinations and four of slot 62-cavity 63 combinations. Four systems of resonant circuits may be employed where the ions employed are of deuterium and helium₃. The two ions are of different masses. They may be forced to rotate in orbit 29c at different velocities in the same electric field even though different in masses. The lighter deuterium ions travel at a velocity higher than that of the helium₃ ions. In such case the frequency of rotation would be different for the two ions. From the frequency for a given set of parameters, i.e., ion density and mass, the frequency of the plasma waves can be calculated. From such calculation the values of impedance effective across the reaction cavity to damp out certain plasma waves can be determined and thereby built into the system to avoid two stream instabilities. Resonant cavity structures may also be provided to further damp plasma waves.

The present invention may also involve an active system. It may be effective in conjunction with the proper termination impedance for damping plasma waves. A finer tuning expedient is provided by an active system. The plasma waves are sensed and an inverse feedback circuit is provided to reduce plasma waves by producing a field opposite in phase to plasma wave.

FIG. 3

Figure 3:
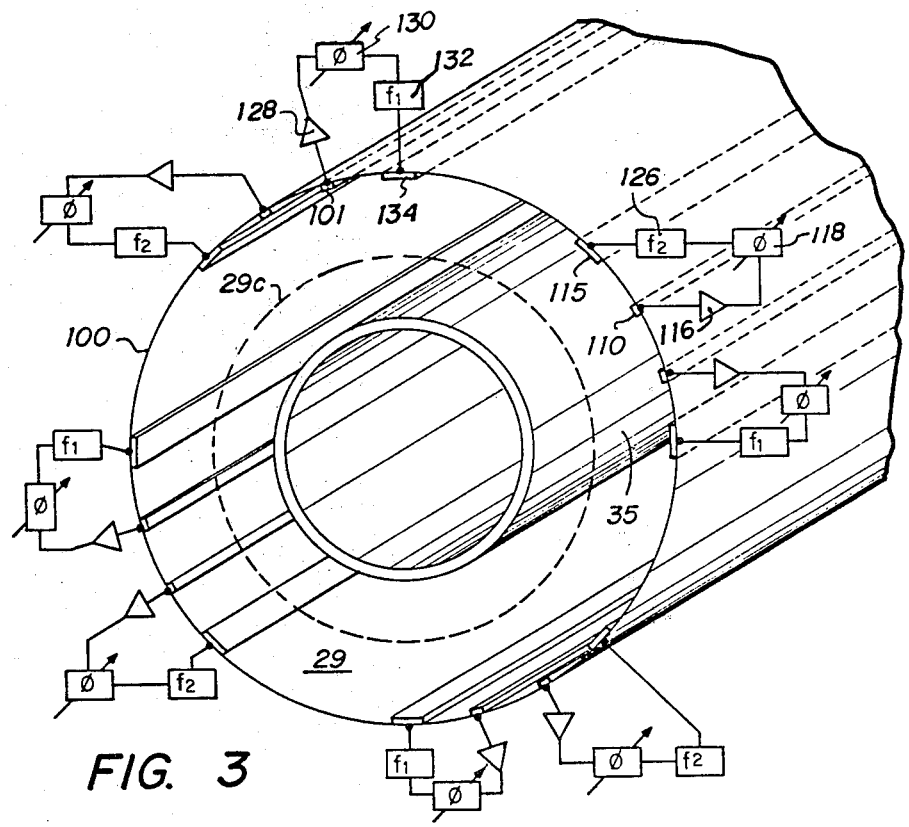
FIG. 3 illustrates a modification of the invention.

FIG. 3 illustrates an active system in diagrammatic form wherein the inner cylinder 35 is enclosed by chamber 100 through which fluid passages (not shown) are formed for the flow of coolant fluid to carry away heat generated therein. However, in this system, rather than have passive slots and resonant cavities, strip electrodes such as electrode 101 are formed at the inner wall of the reaction cavity 29. A voltage is generated between the electrode 101 and the remainder of the cavity structure in dependence upon plasma waves. The signal from electrode 101 is then passed through an amplifier 128, a phase shifting unit 130, and a filter 132 to feed a strip electrode 134, also at the wall of the cavity 29. Filter 132 passes a band of plasma frequencies for one of the sets of ions, namely the set traveling in the clockwise direction.

Similarly, a strip electrode 111 feeds an amplifier 116, a phase shifter 118 and a filter 126 to energize a strip electrode 115. Filter 126 passes a band of plasma frequencies for ions traveling in the counterclockwise direction in the cavity 29.

A plurality of sets of such control loops are provided, alternating between those traveling in one direction and those traveling in the other direction to provide a circular array of pairs of electrodes to sense plasma waves. The voltages thus sensed are applied to electrodes 134 and/or 115 as the case may be to force the scattered ions back into the desired reaction orbit 29c.

Returning now to further details of the system shown in FIG. 1, the electrode 40 is positioned near the end of ring 10 adjacent gap 11 and is supported by electrically conductive rods 40a and 40b, which extend through closure plate 36 by way of insulators 36a. Four supporting rods are employed for electrode 40, only two, rods 40a and 40b, being shown in FIG. 2. Similarly, electrode 41 is supported by four rods 41a, 41b which also pass through insulators 36b in plate 36. The end of cylinder 35 is secured to plate 36 by way of insulators 36c.

The supporting conductor rods 40a–40d and 41a–41d, as well as the central cylinder 35, provide for the application of DC voltages to the electrodes 40, 41 and 42 in order to force ions from source 16 to follow a spiral path of progressively decreasing radius until they enter the cavity liner 29a where they then follow helical paths.

Figure 4:
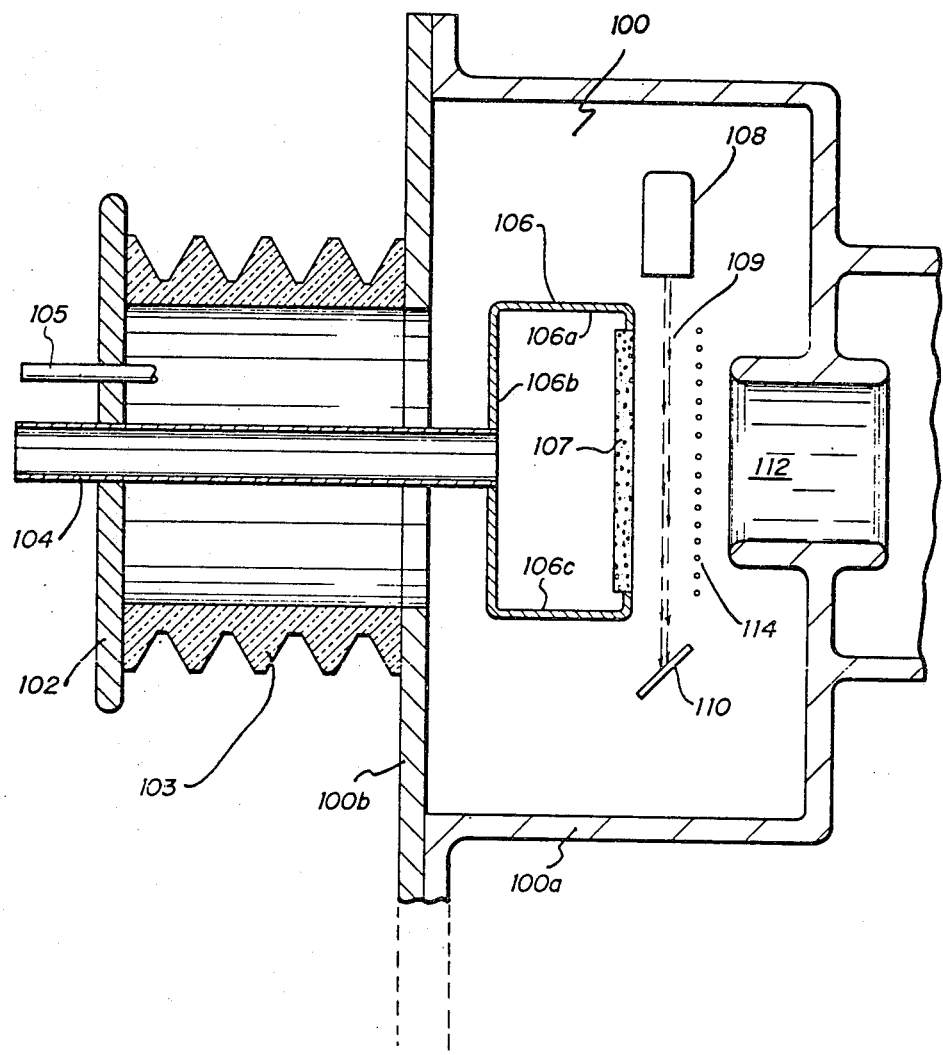
FIGS. 4 and 5 illustrate an ion source for use in the systems of FIGS. 1-3.
Figure 5:
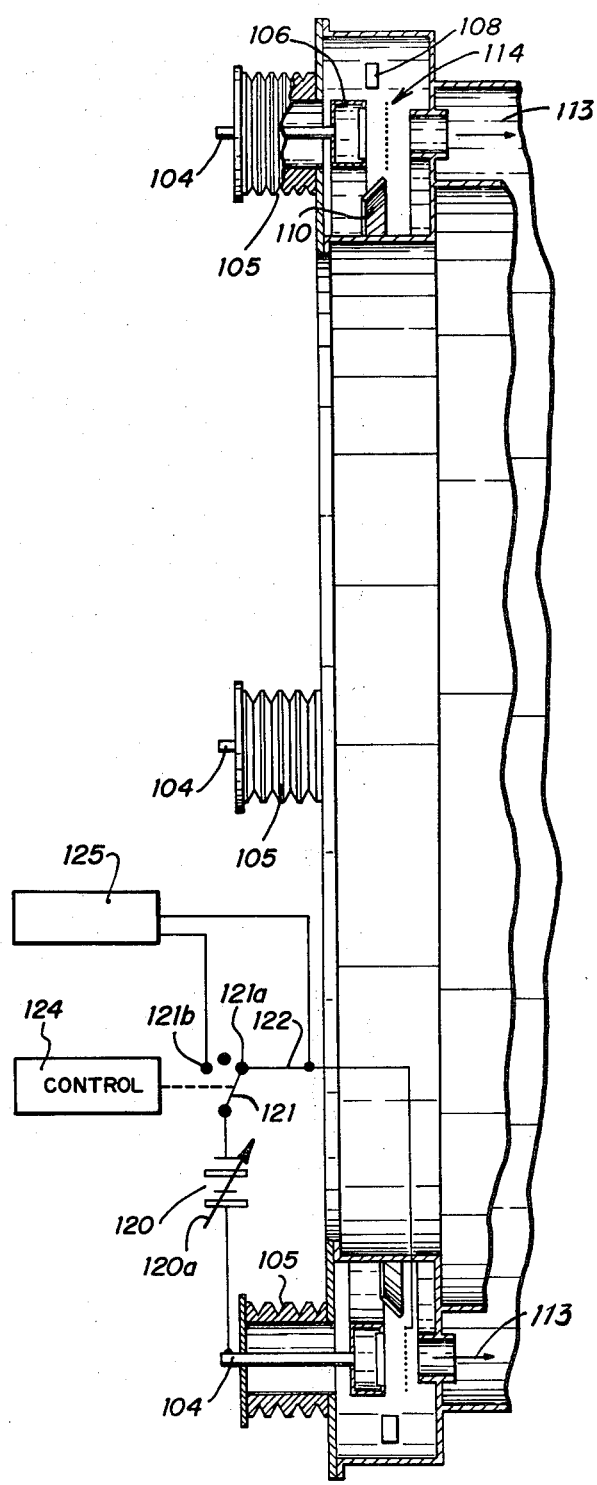

FIGS. 4 and 5

FIG. 4 schematically illustrates one form of a suitable source 16 of FIG. 1 wherein a beam of ions of substantially cylindrical configuration is produced. The system of FIG. 4 is a sectional view of a cylindrical source to be housed within magnetic ring 10 of FIG. 1. FIG. 5 shows the entire source in section, on a reduced scale.

Source 16, FIG. 4, includes structure forming a circular chamber 100 which includes an annular ring cup 100a and a closure ring 100b. Positioned behind closure ring 100b is a support disc 102 which is mounted on and supported by closure ring 100b by a supporting insulator 103. A gas inlet tube 104 extends through the support plate 102 and extends into and supports a circular feed gas manifold 106. A cable 105 passes through a suitable fitting, not shown, in disc 102 to supply power and control voltages to electrodes of source 16.

Feed gas manifold 106, like chamber 100, is a ring formed by three impervious walls 106a, 106b and 106c and a permeable barrier ring 107 which is a permeable barrier ring through which gas used in the system may pass. Immediately in front of the permeable barrier ring 107 is an ion extraction grid 114. A plurality of ion exit channels 112 are formed in the bottom portion of the circular cup 100a. A circular electron gun 108 is positioned as to direct a sheet of electrons 109 radially between barrier ring 107 and extraction grid 114 and toward an electron catcher 110. The elements of FIG. 5 described as circular or annular are mounted symmetrically with respect to axis 35a of FIG. 2. They include annular cup 100a, closure ring 100b, feed gas manifold 106, barrier ring 107, electron gun 108, electron catcher 110 and ion extraction grid 114.

Ion exit channel 112 may be a continuous ring-shaped slot in the bottom of chamber 100 or it may be substantially continuous by providing a plurality of circular holes which are almost tangent one to another. Alternatively, it may comprise a plurality of slits arrayed about the axis 35a of FIG. 1.

In operation, a suitable gas is introduced through inlet tube 104 into the gas manifold 106. The atoms of the gas then pass through the barrier ring 107 at a rate determined by the pressure of the gas in the manifold 106. The atoms of the gas emerging from the barrier strip are bombarded by electrons in electron beam 109 to produce ions from the gas. A positive potential on the extraction grid 114 accelerates the ions to form an ion beam 113 and to repel electrons back toward the barrier ring 107.

Referring now to FIG. 5, it will be noted that in the system thus far described four gas inlet tubes 104 are provided, three of which are shown, along with their three support cable 105.

Further, in FIG. 5 it will be seen that the manifold 106, electron gun 108, electron catcher 110, and the ion extraction grid 114 are all of ring-like construction. Ion source 16 of FIGS. 4 and 5 will be mounted in the magnetic ring 10 of FIG. 1, whereas a similar source is mounted in magnetic ring 12 to comprise the source 17 of FIG. 1.

Each of the ion sources 16 and 17, FIG. 1, comprises a supply of feed gas, or in the alternative a sutable feed liquid, together with a source of ionizing electrons that produce a plasma from gas released through the permeable barrier ring 107. A suitable voltage applied to the extraction grid 114 extracts ions from the plasma and focuses them in a columnated exit beam 113.

Ion sources 16 and 17 each produce a thin sheet of ions of cylindrical configuration. The axis of the beam coincides with the axis 35a. Thus, the ion paths form a substantially cylindrical continuum. Ions issuing from sources 16 and 17 are controlled so that all travel within a common cylindrical annulus with appropriate energies. The beam from source 16 travels in direction opposite the beam from source 17.

In the example shown in FIGS. 4 and 5, the porous barrier ring 107 which limits the feed of gas can be made of porous tungstun, molybdimum, tantilum, carbon, or conductive ceramic. If hydrogen isotopes are used, paladium, titanium, zirconium or indium can be used as barrier material. Electron gun 108 is so positioned as to produce a sheet of electrons flowing inwardly and radially across the face of the porous barrier ring 107. The energy of the electrons is selected to produce copious ionization in the gas issuing from the barrier ring 107. While suitable sources of such electrons are well known, it is noted that an indirectly heated cathode may be used where the cathode is made of nickel coated with oxides or carbonates of strontium, barium, calcium or rare earth elements. The electron gun 108 preferably will be maintained at a negative potential relative to the gas manifold 106. The negative voltage is adjusted as to be near the peak of the ionization cross section curve for the gas employed. Voltages of the order of 100 volts would be involved. The plane of the electron beam is selected so as to be substantially perpendicular to the accelerating electrical fields in the plasma chamber as produced by the voltages on ion extraction grid 114.

In order to obtain an adequate current of positive ions, the electron current issuing from the electron gun is preferably larger than the desired ion current, particularly if the ions have more than one unit charge. The pressure in the supply chamber 100 is of the order of between 0.01 and 10 atmospheres. The ion extraction grid 114 directly in front of the plasma region is of the order of 10 kilovolts negative with respect to the barrier ring 107. This causes positive ions in the gas plasma to be drawn through the grid. An accelerating voltage is applied between manifold 106 and the structure forming the exit channels 112. The exit channels 112 preferably are aligned with corresponding openings in the ion extraction grid 114.

The electric potential of support disc 102 and feed gas manifold 106 may be of the order of up to 200 kilovolts negative with respect to the annular chamber 100. The pressure of the gas plasma in front of gas barrier ring 107 would be controllable and in the range of from 0.1 to 20 millitorr. In a modification of the invention, the cylindrical ion beam of FIGS. 4 and 5 is not used. Rather, a plurality of spaced apart point sources is utilized. Such sources would be arrayed at uniform radii about the axis 35a of FIG. 1. In appearance they would be as shown in FIG. 5, understanding that plural manifolds, electron guns, extraction grids and exit channels would be provided to produce a plurality of pencil ion beams.

The ion sources of FIGS. 1–5 have involved use of an electron beam to ionize the plasma. It will be appreciated that because of the relatively low energy involved, a cyclotron could be employed in place of the ion sources. The cyclotron could be a relatively small unit.

The system of FIGS. 1–5 has been described as in continuous operation wherein constant operating conditions are maintained including application of suitable voltages to the extraction grids 114. The efficiency of the reaction system is dependent upon the square of the number of ions in the reaction zone rather than being a linear function of that number, so that maintenance of uniform conditions may not be desired.

In FIG. 5 an accelerating voltage from a source 120 is connected at its positive terminal to the gas inlet tube. The negative terminal is connected by way of a switch arm 121 to a switch terminal 121a from which a line 122 extends and which is connected to the extraction grid 114. The negative voltage on the extraction grid attracts the ions in the plasma zone and directs them toward the exit openings. For continuous uniform operation, the switch 121 would be maintained in contact with terminal 121a to complete the circuit through line 122. If intermittent operation is desired, a controller 124 periodically will actuate switch 121 at rates and for intervals which may be variable, depending upon power demand, so that the ion beams would be produced only intermittently.

Source 120 may be of form which provides a selectively variable extraction voltage, being varied by conventional means as indicated by arrow 120a. This may be useful in start-up operations. Deuterium ions for example would be accelerated at a given voltage to travel through the reaction zone at one diameter. Helium three ions accelerated at a voltage selected by adjustment of the source corresponding to source 120, to cause the Helium three ions to orbit at a different diameter. Once the streams are established, one or both of the extraction voltages will be adjusted to cause the counter-current streams to orbit at the same diameter to initiate fusion reactions.

With switch 121 at contact 121b, source 125 may provide a periodic modulation voltage to cause the two streams in reaction space to weave through each other. The modulation voltage may be controlled in frequency and/or amplitude to control the level of power output.

The amount of energy released is at least proportional to the square of the density of the stream and is not linear. Therefore, it may be advantageous to have zones of high density and of low density, i.e., nodes and antinodes. High production from nodes may more than make up for lowering in production at antinodes.

FIG. 6

Figure 6:
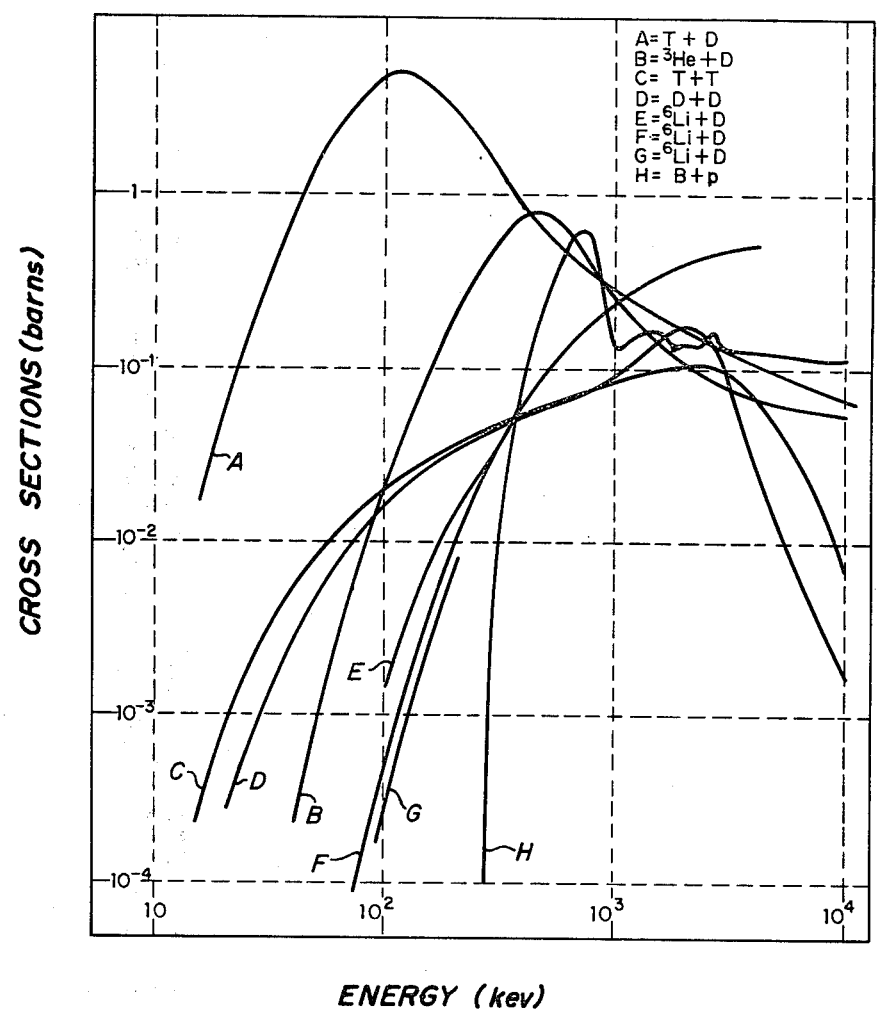
FIG. 6 is a graph showing the cross section for various reactions that may be employed.

FIG. 6 illustrates cross sections for several fusion reactions. Particle energy, in electron volts, is plotted on the ordinates. The reaction cross section, in barns, is plotted along the abscissa where each barn is $10^{-24}$ cm$^2$.

FIG. 6 indicates that fushion of deuterium and tritium is probably the easiest reaction to manage. More particularly, nuclei at 20 KeV of deuterium and tritium have, from FIG. 6, curve A, a fusion cross section of about 0.1 barn. Particles having relative energy of 115 KeV have a fusion cross section up to 5 barns. The DT reaction produces a neutron of relatively low energy, i.e.: 3.2 MeV. Neutron production may or may not be desirable, as will be discussed later.

The reaction represented by curve B where helium three and deuterium are employed is preferred. In that reaction a helium atom and a proton are produced, plus 18.3 MeV of energy per reaction.

The cross section for the reaction between lithium and deuterium to produce two helium atoms is only partially shown and is not further available. However, it appears to be attractive, the reaction being:

$$D_2 + Li_6 \rightarrow 2He_4 + 22.4 \text{ MeV} \qquad (3)$$

Other modes of operation may prove to be equally or perhaps more desirable. For example, note the reaction between boron ions and protons from the curve H of FIG. 6.

It should be understood that the data shown in FIG. 6 comprises the cross sections for various reactions in a thermonuclear case, i.e., where particle velocity is randomly directed. It is to be understood in the present case where the motion is not random, but wherein particle velocities are in head-on collision courses, the cross section is significantly greater by an amount approximately equal to the square root of 6.

From the foregoing it is shown that nuclear particles are directed and controlled to produce head-on collisions in opposing beams of suitable positive ions. This is in contrast with the usual concept of plasma which is thermal, i.e., random, and includes undesirable electrons which radiate profusely, but are necessary for plasma neutralization.

Thermal plasma which is hard to contain and which is inefficient for energy release is avoided. Such inefficiency exists because only a small fraction of positive ions in the thermal plasma have the right conditions for fusion, namely, that part of Maxwellian distribution which has the right kinetic energy and relative direction.

In accordance with the present invention, selected positive ions move in helical paths, the grades of which are independently controllable, traveling at the same radii and in opposite directions, hence optimal for head-on collisions.

A most important property of the focusing employed is that beam radii are stable. That is, any particle deviating from the radius is automatically pulled back into the stable radius. Thus, the ions are forced to form a thin sheet of oppositely moving helical beams. Since the helical grade can be made as small as desired and is independently controllable, the interaction length of the opposing beams can be made very large, hence the collision probability can be made to approach unity.

The velocities can be selected to assure operation at the point of the maxima in the fusion reaction cross section. Most head-on or near head-on collisions lead to fusion with attendant release of fusion energy. Maxima in the reaction cross sections for nuclei under consideration are 4–10 times larger than coulomb scattering cross sections so that only a small fraction of the nuclei undergoes coulomb scattering. Of those coulomb scattered particles the ones that undergo a small-angle scattering will go back into the beam due to the aforementioned stability. Between the small angle and fusion cross section some coulomb scattered particles will hit the walls and get lost, but their energy is not entirely lost since they contribute to the extracted heat. Ions scattered at large angles as to follow oval paths such as path 29d will be controlled as above described.

Particles that pass through the reaction region without interaction are still directed beams. These directed beams can be used for direct electrical energy conversion with high efficiency, hence they should not be considered lost.

The energy conversion efficiency from heat to electricity or to mechanical energy can be as high as 45% to 50%. Thus, the ratio of reaction output to beam input energy may be the order of 61 to 1. The reaction:

$$He_3 + D_2 \rightarrow He_4 + p + 18.34 \qquad (4)$$

gives this ratio. In such case, about 40% to 45% of total fusion energy is recoverable.

It is known and can be shown that the stability condition for focusing a particle is given by the equation:

$$\frac{r_0^2 v_0^2}{r^3} - \frac{v_0^2}{r} = \frac{dr}{dt^2} \qquad (5)$$

where:
$r_0$ = the stable radius
$v_0$ = particle velocity
$r$ = the instantaneous radius If a particle deviates at a small angle in either direction from the stable radius $r_0$ for velocity $v_0$, the particle is pulled back to the stable orbit $r_0$.

The small oscillations die down by means of dissipative currents at the walls and in the pyrolytic carbon coating. Thus, stable and extremely dense beams of particles are produced.

As above noted, the beam thickness can be very small and particle density can be made very large by means of independently controlling the ion sources and the ion velocities.

It is to be noted that space charge does not lead to beam spreading because as focused the wall develops a charge density:

$$q = -e\phi^2 \epsilon_0 / 2\pi r_a^2 \qquad (6)$$

and, thus, overall beam spread due to space charge is prevented. The space charge effect is compensated by q. The only remaining particle deviations from the beam are due to the coulomb scattering of individual particles due to the granular nature of the charges. Under these conditions the charge density for positive ions is given by the equation:

$$\rho = + \frac{Ze\epsilon_0 \phi^2}{2\pi^2 M r^4} \qquad (7)$$

where:
Z is the charge-number of the positive ion;
$\phi$ is the magnetic flux which originally guides the ion beam into the circular Harris orbit;
M is the mass of the particle; and
r is the radius of the orbit.

Charge density, and thus particle density, depend upon the inverse of $r^4$. This particle density increases by a large factor by starting with a large radius and then compressing the beam to a small radius. The compression is achieved by bending the ion beam, which is originally obtained via a steady electric field. The radial magnetic field is the term $\phi$ in equation (7). The beam is fed into the small stable radius in zone 32, FIG. 1, as controlled by the passive and/or dynamic controls of FIGS. 1 and 3, as well as by the dominant electrostatic focusing due to the radial field between cylinder 35 and housing 31. Since $e\phi^2/Mr^4$ can be very large, the particle density can be made very large. This means that the reaction rates can be made large, leading to extraction of large useful power.

While there may be widely varying embodiments of the invention, the following is given by way of example:
The diameter of the ion source may be 2 meters. The length of cylindrical reaction zone may be 2 meters.
The ion sources and their coupling to the reaction zone may total 4 meters so that the total size of the reactor could be 2 meters high, 2 meters wide and 6 meters long.

In such reactor the stability condition permits formation of a beam thickness as low as $\delta r = 100$ Å at a radius of $r_0 = 10$ cm in the reaction cavity 29.

Assume that the ion source 17, FIG. 1, produces 1 ampere of 200 KeV singly charged deuterium ions in the form of a cylindrical sheath of $10^{-2}$ cm thickness at the source radius of 1 meter. Then at the 10 cm radius of the reaction zone 22, the sheath thickness will be compressed down to $10^{-6}$ cm, i.e., 100 Å.

The pitch of the ion path in the reaction zone can be made to be $1.25 \times 10^{-2}$ cm. The resultant current density in the ion sheath will then be $8 \times 10^7$ amperes/cm².

Assume also that source 17, FIG. 1, produces 2 amperes of 400 KeV doubly charged helium three ions at the other end of the reactor of FIG. 1.

Under these conditions of current density and a nuclear reaction cross section of 1.9 barns, the two circumferential counter flowing beams will be largely consumed while transversing the reaction zone 22 of the reactor. The fusion energy released in the process will be about 18.3 megawatts, which averages out to be about 750 watts/cm² thermal) in the 2400 cm² walls of the reaction cylinder 35.

Overall system size depends on not only the reactor, but also the thermal power plant. It may be desired to produce neutrons. In such case shielding must be employed which affects physical plant size. If the deuterium-tritium reaction of equation (1) is employed, the system could be used as a copious source of high energy neutrons. In such case, the energy could be utilized to bombard thorium or $U^{238}$ for producing fissionable materials. Thus, a plant can be operated both as a neutron source, as well as a power plant. Because neutrons are valuable and have a variety of uses, it may be desirable to use materials indicated which lead to neutron production while at the same time producing heat energy. Extraction of heat from the system may be achieved by circulating steam, mercury vapor, helium or air through units such as heat exchangers 52 and 55, FIG. 1. In the latter case, the system could operate as a heat source for a jet engine.

The electric field across the cylindrical reaction zone 22 which holds the ions at their stable radii is known from equation:

$$E_r = \frac{M}{Ze} r_0 \left(\frac{d\theta}{dt}\right)^2 = \frac{M}{Ze} \cdot \frac{v_0^2}{r_0} \quad (8)$$

For example where:
$v_0 \approx 5 \times 10^8$ cm/sec.,
$r_0 = 10$ cm,
$M = (2 \text{ to } 10) \times 10^{-24}$ grams,
$Z = (1 \text{ to } 5)$, and
$e = 4.8 \times 10^{-10}$ esu.

Thus, $E_r \approx (5 \text{ to } 25) \times 10$ esu cm, or about 15,000 to 75,000 volts/cm. Because the final beam thickness may be much smaller than a millimeter, the electric field can be applied across a gap of only one millimeter and, thus, the voltage required from the guiding power supply would range from 1500 to 7500 volts.

In obtaining beams of high density positive ions, an operation related to what is known in the electron art as Harris focusing is employed. Harris focusing is of the type described in W. W. Harmon, *Fundamentals of Electronic Motion*, McGraw-Hill Book Company, Inc., 1953, pages 161 and 162.

As above described, the ion beams are deflected from an initial path parallel to the axis of 35a, FIG. 1, to paths which are circumferential or of spiral shape. In FIG. 1 electromagnets are employed for establishing the magnetic fields through which the beams are deflected. It is to be understood, of course, that permanent magnets may be used, either alone or with auxiliary coils associated therewith for adjusting the precise pitch desired on a given beam.

It will also be appreciated that in the case of the reaction of equation (4) where helium three and deuterium are employed, the ions in the respective beams will have different masses. In order for them to be confined within the reaction zone 22 at the same radius, the initial acceleration of the ions will differ. More particularly, as an ion is forced into a helical orbit the centrifugal force tends to cause it to travel tangentially out of orbit. The electric fields imposed restrain the ions in the orbit by reaction between the field and the charge on the particle. For example, the deuterium ion has a mass of 2 and a charge of 1. Helium three has a mass of 3 and a charge of 2. In utilizing deuterium and helium three in accordance with the present invention, the helium three ions would be given the greater initial velocity so that under the influence of the same electric field in the reaction zone 22 the helium ions and the deuterium ions would occupy the same space, i.e., would orbit at the same radii.

It will also now be appreciated that the systems of FIG. 2 and FIG. 6 operate by producing collisions between streams of ions which travel not only in opposite directions with reference to their circumferential path, but also advance from opposite directions toward the reaction zones. Either of the two systems of FIG. 1 and FIG. 6 may be modified so that the two beams advance to the reaction zone in the same sense, while circumferentially traveling in opposite senses, thereby causing the ions to travel in head-on collision courses.

Having described the invention in connection with certain specific embodiments thereof, it is to be understood that further modifications may now suggest themselves to those skilled in the art and it is intended to cover such modifications as fall within the scope of the appended claims.

I claim:

1. In a fusion reaction system where ions from two sources spiral toward each other on common axis while rotating in opposite senses in orbital paths of common radii in an annular reaction zone of circular symmetry at any given cross section perpendicular to the axis of said paths and bounded by spaced apart outer and inner coaxial electrode walls for promoting collisions of ions in one beam with ions in the other beam, the improvement comprising:
   (a) electrostatic field means for causing said ions normally to orbit at said radii in said zone; and
   (b) structure for establishing electric focusing fields operable in the absence of any effective magnetic fields within said reaction zone to force ions traversing scatter paths back into said orbital paths.

2. The system of claim 1 wherein said structure includes:
   electrical circuit means having means for sensing plasma waves and elements in circuit therewith tuned to the frequency of said plasma waves of ions from one of said sources to attenuate said waves.

3. The system of claim 1 wherein cavities at the perimeter of said zone resonate at a plasma wave frequency for ions from one of said sources to damp the plasma waves.

4. The system of claim 1 wherein electrodes arranged around the perimeter of said zone are connected in circuits with means including tuning means to include at least one plasma wave frequency for ions from one of said sources for attenuation of plasma waves.

5. In a fusion reaction system where ions from two sources spiral toward each other on common axis while rotating in opposite senses in orbital paths of common radii in an annular reaction zone of circular symmetry at any given gross section perpendicular to the axis of said paths and bounded by spaced apart outer and inner coaxial electrode walls for promoting collisions of ions in one beam with ions in the other beam, the improvement comprising:
   (a) electrostatic field control means to cause said ions normally to follow orbital paths of said radii; and
   (b) electrical circuit means associated with one of said electrodes and tuned to a frequency representative of wave action of said ions in said zone operable in the absence of any effective magnetic fields for exerting stabilizing forces on said ions within said zone for limiting travel through said zone substantially to said paths of said radius.

6. The combination set forth in claim 5 in which the larger of said electrodes is thick-walled and has cavities therein, some of which form coolant courses connected to a coolant flow system and some of which are connected to said reaction zone by slots wherein the slots and cavities form resonant systems related to characteristics of flow of said ions.

7. The combination set forth in claim 5 in which sensor means mounted on the inside of the larger of said electrodes provides for sensing wave motion in the ion streams in said zone and wherein circuit means responsive to said sensor means establishes ion control fields in said zone to generate said forces.

8. The combination set forth in claim 5 in which two sets of said sensors and said circuit means are provided, one set of which is directional preferential in one sense and the other set of which is directionally preferential in the opposite sense.

9. In a fusion reaction system where ions from two sources spiral toward each other on common axis while rotating in opposite senses in orbital paths of common radii in an annular reaction zone of circular symmetry at any given cross section perpendicular to the axis of said paths and bounded by spaced apart outer and inner coaxial electrode walls for promoting collisions of ions in one beam with ions in the other beam, the improvement comprising:
(a) electrostatic field means operable in the absence of any effective magnetic fields for substantially limiting travel through said zone to orbital paths of the same radii with the walls of at least one of said electrodes having coolant courses connected to a coolant flow system and structure forming cavities in the larger of said electrodes, said cavities being connected to said reaction zone by slots in the walls of said larger electrode wherein the slots and connected cavities form passive systems at resonance relative to characteristics of flow of said ions and which establish focusing fields within the reaction zone to force said ions into paths of said radii.

10. The combination set forth in claim 9 in which said cavities of said resonant systems are cylindrical and have axes parallel to the axis of said reaction zone.

11. The combination set forth in claim 10 in which said coolant course and said resonant cavities are arrayed symmetrical to the axis of said reaction zone in alternate relation.

12. The combination set forth in claim 10 in which said slots lie in a radial plane common to the axis of said reaction zone.

13. The combination set forth in claim 9 in which said systems are resonant at a plasma wave frequencies relative to the flow of ions in said helical paths.

14. The combination set forth in claim 9 in which said slots contain high dielectric material and said connected cavities contain lossy material.

15. In a fusion reaction system where ions from two sources spiral toward each other on common axis while rotating in opposite senses in orbital paths of common radii in an annular reaction zone of circular symmetry at any given cross section perpendicular to the axis of said paths and bounded by spaced apart outer and inner coaxial electrode walls for promoting collisions of ions in one beam with ions in the other beam, the improvement comprising:
(a) sensing plasma waves produced by ions as they leave said paths in said zone; and
(b) in response to the sensed plasma waves establishing electric fields in the absence of any effective magnetic fields to force said ions back into said orbital path.

* * * * *